(12) United States Patent
Shi et al.

(10) Patent No.: US 12,506,760 B2
(45) Date of Patent: Dec. 23, 2025

(54) LARGE NETWORK GRAPH PROCESSING

(71) Applicant: PayPal, Inc., San Jose, CA (US)

(72) Inventors: Jia Shi, Shanghai (CN); Lin Zhu, Shanghai (CN)

(73) Assignee: PayPal, Inc., San Jose, CA (US)

( * ) Notice: Subject to any disclaimer, the term of this patent is extended or adjusted under 35 U.S.C. 154(b) by 290 days.

(21) Appl. No.: 18/305,566

(22) Filed: Apr. 24, 2023

(65) Prior Publication Data
US 2024/0323211 A1   Sep. 26, 2024

(30) Foreign Application Priority Data

Mar. 24, 2023   (WO) ................ PCT/CN2023/083556

(51) Int. Cl.
*H04L 9/00* (2022.01)
*G06F 16/901* (2019.01)
*H04L 9/40* (2022.01)

(52) U.S. Cl.
CPC ...... *H04L 63/1425* (2013.01); *G06F 16/9024* (2019.01); *H04L 63/102* (2013.01)

(58) Field of Classification Search
CPC .............. H04L 63/1425; H04L 63/102; G06F 16/9024
See application file for complete search history.

(56) References Cited

U.S. PATENT DOCUMENTS

| | | |
|---|---|---|
| 10,496,768 B2 | 12/2019 | Zhang |
| 11,068,384 B2 | 7/2021 | Zhang |
| 11,221,876 B2 | 1/2022 | Wu |

(Continued)

FOREIGN PATENT DOCUMENTS

| | | |
|---|---|---|
| CN | 107609983 A | 1/2018 |
| CN | 110781940 A | 2/2020 |

(Continued)

OTHER PUBLICATIONS

International Search Report and Written Opinion for Application No. PCT/CN2023/083556 mailed on Jun. 23, 2023, 8 pages.

(Continued)

*Primary Examiner* — Syed M Ahsan

(74) *Attorney, Agent, or Firm* — Kowert, Hood, Munyon, Rankin & Goetzel, P.C.; Catherine L. Gerhardt; Dean M Munyon

(57) ABSTRACT

Techniques are disclosed for detecting whether an entity associated with a node of a summary graph is suspicious by retrieving, from a graph database storing a network graph representing a plurality of electronic communications, a portion of the network graph that includes a set of target nodes. Based on the target nodes included in the portion of the network graph, the server system generates community graphs that includes at least a target node and nodes connected to the target node. The server system assigns, based on similarities between the community graphs, the community graphs to clusters and generates a closure graph for clusters, including combining two or more community graphs within respective clusters. Based on respective closure graphs, the server system performs preventative actions relative to entities represented by nodes included in respective closure graphs and connected to the target nodes.

20 Claims, 11 Drawing Sheets

(56) References Cited

U.S. PATENT DOCUMENTS

| | | |
|---|---|---|
| 11,442,920 B2 | 9/2022 | Zang |
| 11,455,238 B2 | 9/2022 | Zhang |
| 11,620,338 B1 * | 4/2023 | Bullard ................. G06F 16/287 707/798 |
| 2007/0239694 A1 | 10/2007 | Singh et al. |
| 2018/0060341 A1 | 3/2018 | Wu |
| 2019/0384861 A1 | 12/2019 | Ghoting et al. |
| 2020/0409931 A1 | 12/2020 | Zang |
| 2021/0334312 A1 | 10/2021 | Neo |
| 2022/0004580 A1 | 1/2022 | Li |
| 2022/0051125 A1 | 2/2022 | Ho et al. |
| 2022/0329608 A1 * | 10/2022 | Liu ..................... H04L 63/1416 |

FOREIGN PATENT DOCUMENTS

| | | |
|---|---|---|
| WO | 2021120000 A1 | 6/2021 |
| WO | 2021134432 A1 | 7/2021 |

OTHER PUBLICATIONS

Huahai He and Ambuj K. Singh, "Closure-Tree: An Index Structure for Graph Queries," University of California, Santa Barbara, Proceedings of the 22nd International Conference on Data Engineering, 2006, 12 pages.

* cited by examiner

*Example Similarity Calculation 350*
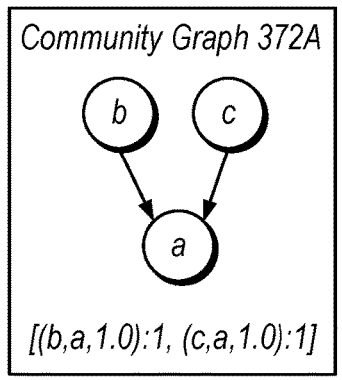
Community Graph 372A
[(b,a,1.0):1, (c,a,1.0):1]
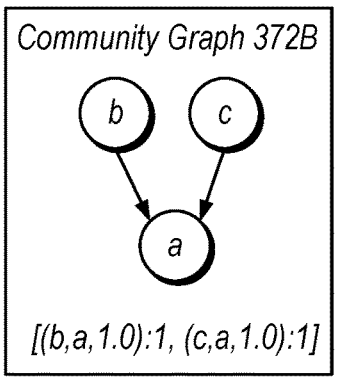
Community Graph 372B
[(b,a,1.0):1, (c,a,1.0):1]
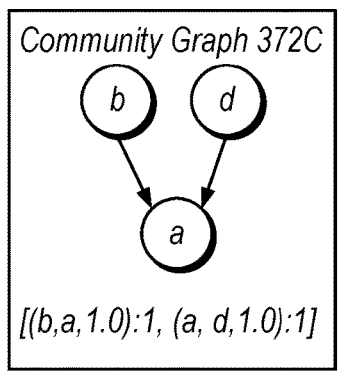
Community Graph 372C
[(b,a,1.0):1, (a,d,1.0):1]
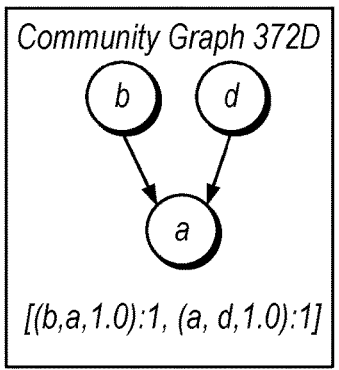
Community Graph 372D
[(b,a,1.0):1, (a,d,1.0):1]
*Similarity Matrix 352*
|    | C1  | C2  | C3  | C4  |
|----|-----|-----|-----|-----|
| C1 | 1   | 1   | 0.5 | 0.5 |
| C2 | 1   | 1   | 0.5 | 0.5 |
| C3 | 0.5 | 0.5 | 1   | 1   |
| C4 | 0.5 | 0.5 | 1   | 1   |
|      | (b,a,1.0) | (c,a,1.0) | (a,d,1.0) | Vector  | Similarity |
|------|-----------|-----------|-----------|---------|------------|
| 372A | 1         | 1         | 0         | [1,1,0] | Cos([1,1,0],[1,0,1]) =0.5 |
| 372C | 1         | 0         | 1         | [1,0,1] |            |
*Example Similarity Calculation 362*
*Example Clusters 320 (Generated Based on Similarity Matrix 352)*
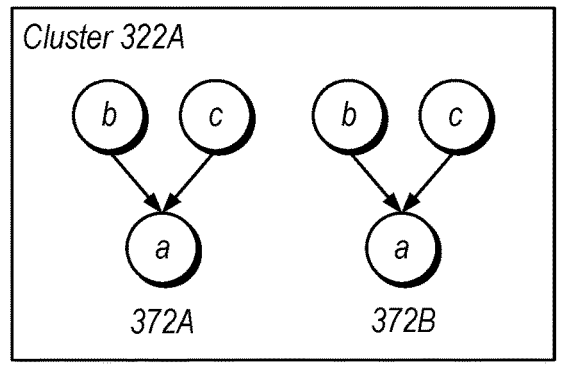
Cluster 322A
372A      372B
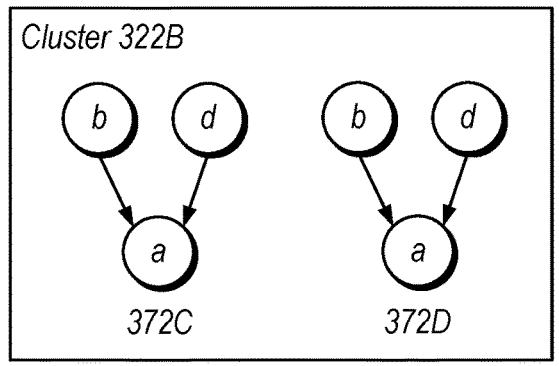
Cluster 322B
372C      372D
*Fig. 3B*

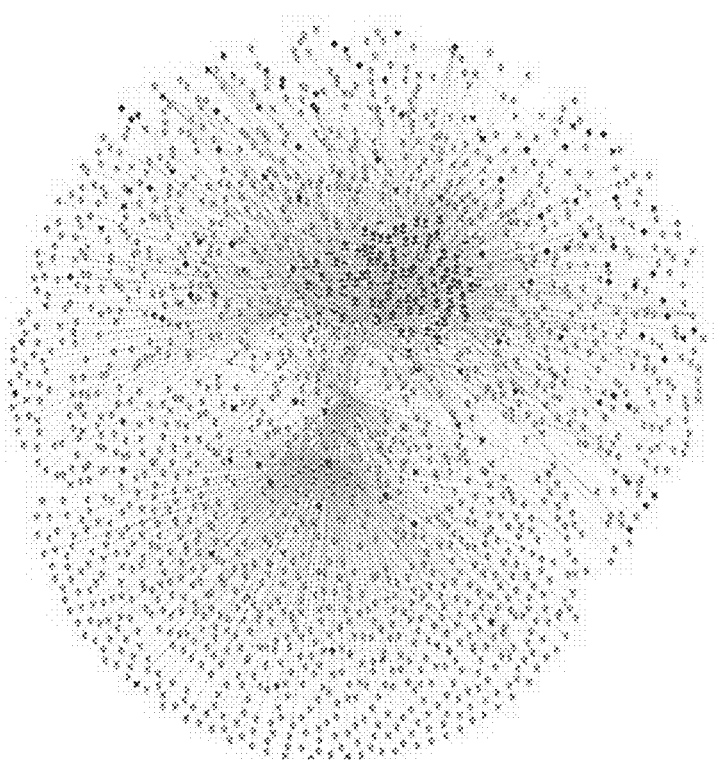
*Example Network Graph 510*
*Example Summary Graph 520 and Data 540*
| Target Node Properties 530 | | |
|---|---|---|
| | Cluster Identifier | 1 |
| | Total Target Nodes | 39 |
| | Node Verifier Status | Unverified 89.66% |
| | Country Code | US 100% |
| | Account Name Present? | Yes 100% |
| | New Account (For Target Node) | False 100% |
| | Person-to-Person | 82.76% True |
| | Account Status | 93.1% Unlocked |
⋮
| | |
|---|---|
| A | Target Account |
| B | Large Account |
| C | Sender (Size 3) |
| D | Large Account |
| E | Receiver (Size 5) |
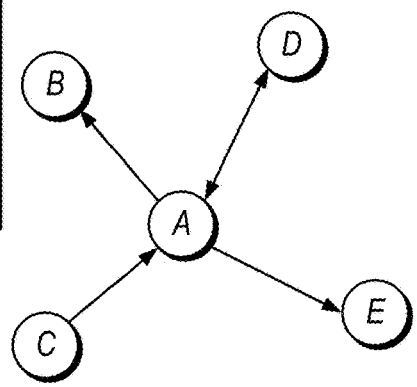
*Fig. 5*

Method
700

```
┌─────────────────────────────────────────────────────────────────────┐
│ Retrieve, from a graph database storing a network graph representing a plurality of │
│  electronic communications, a portion of the network graph that includes a set of target │
│                                 nodes.                              │
│                                  710                                │
└─────────────────────────────────────────────────────────────────────┘
                                    ↓
┌─────────────────────────────────────────────────────────────────────┐
│ Generate, based on the target nodes included in the portion of the network graph, │
│ community graphs, where respective community graphs include at least a target node and │
│              one or more nodes connected to the target node.        │
│                                  720                                │
└─────────────────────────────────────────────────────────────────────┘
                                    ↓
┌─────────────────────────────────────────────────────────────────────┐
│  Assign, based on similarities between the community graphs, the community graphs to │
│                         one or more clusters.                       │
│                                  730                                │
└─────────────────────────────────────────────────────────────────────┘
                                    ↓
┌─────────────────────────────────────────────────────────────────────┐
│ Generate a closure graph for respective clusters, including combining two or more │
│              community graphs within respective clusters.           │
│                                  740                                │
└─────────────────────────────────────────────────────────────────────┘
                                    ↓
┌─────────────────────────────────────────────────────────────────────┐
│ Perform, based on respective closure graphs, one or more preventative actions relative to │
│  one or more entities represented by one or more nodes included in respective closure │
│               graphs and connected to the target nodes.             │
│                                  750                                │
└─────────────────────────────────────────────────────────────────────┘
```

Fig. 7

LARGE NETWORK GRAPH PROCESSING

PRIORITY CLAIM

The present application claims priority to PCT Appl. No. PCT/CN2023/083556, entitled "LARGE NETWORK GRAPH PROCESSING," filed Mar. 24, 2023, which is incorporated by reference herein in its entirety.

BACKGROUND

Technical Field

This disclosure relates generally to graphing large networks of data, and, more specifically, to techniques for graphing and processing data for electronic communications.

Description of the Related Art

As more and more communications (e.g., packages sent between servers, transactions, emails, messages, etc.) are conducted electronically via online processing systems, for example, these processing systems become more robust in managing data for these communications as well as detecting suspicious and unusual behavior. Many communication requests for a computer system may be submitted with malicious intent, often resulting in wasted computer resources, network bandwidth, storage, CPU processing, etc., if those communications are authorized and processed. Some communication processing systems attempt to analyze various communication data for previously processed and currently initiated communications to identify and mitigate malicious behavior.

BRIEF DESCRIPTION OF THE DRAWINGS

FIG. 3B is a block diagram illustrating example similarity calculation and cluster generation, according to some embodiments.

FIG. 5 is a diagram illustrating an example summary graph and summary data, according to some embodiments.

FIG. 7 is a flow diagram illustrating a method for generating closure graphs for use in determining to perform preventative actions relative to entities represented via nodes of the closure graph, according to some embodiments.

DETAILED DESCRIPTION

Figure 1:
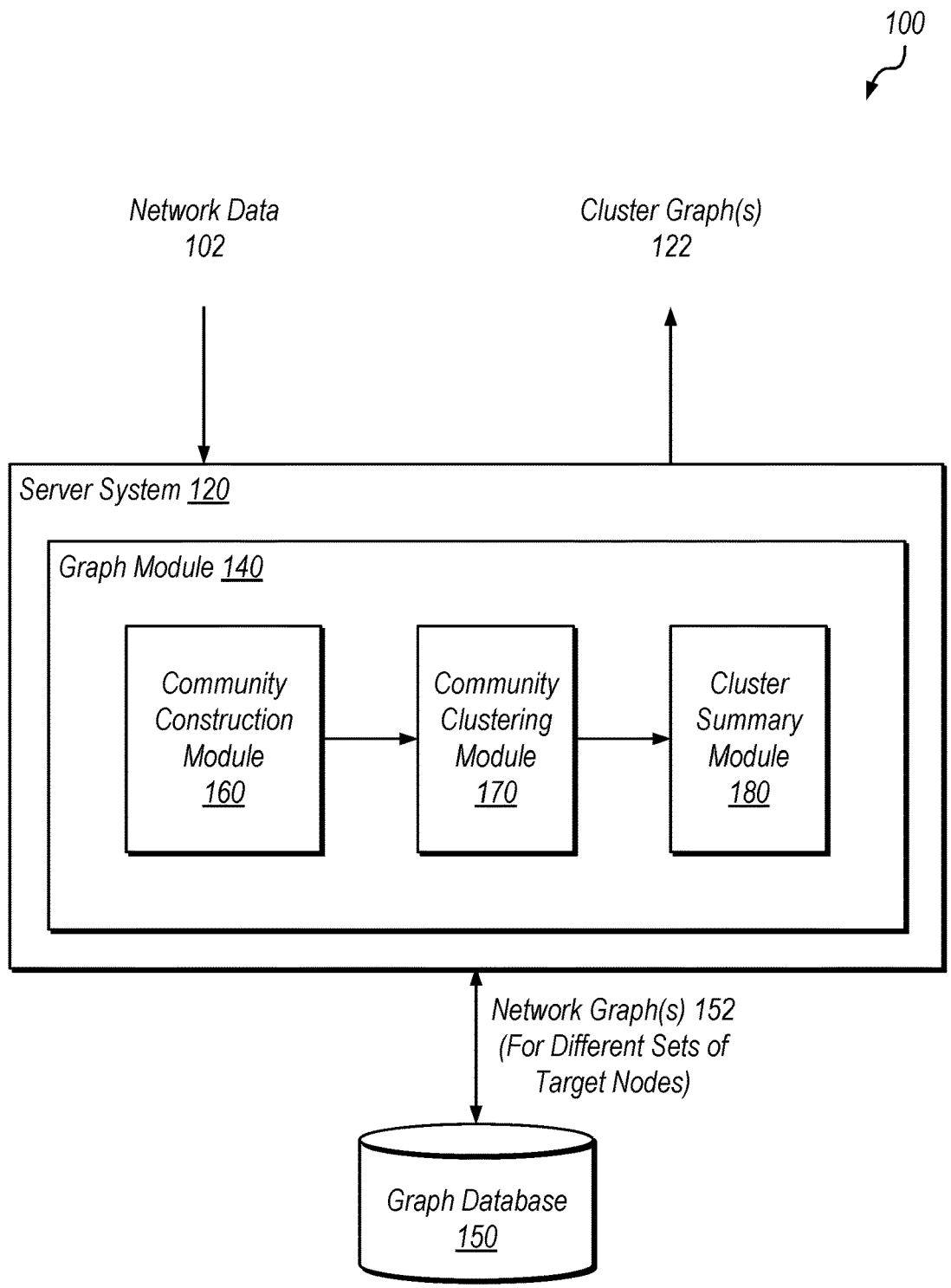
FIG. 1 is a block diagram illustrating an example graph processing system configured to generate closure graphs, according to some embodiments.

As the processing bandwidth of different entities increases, retrieval and manipulation of data for such entities (e.g., to generate a summary of the data, to perform various data analytics processes on the data, etc.) becomes increasingly time and resource-intensive. In addition, the large amount of retrieved data may be difficult to understand due to the scope of the data available. For example, some entities may be associated with billions of completed electronic communications, with millions of new communications being processed on a monthly, weekly, daily, etc. basis. In order to provide visuals for analysis of large datasets, many electronic communication processing systems generate a network graph in which nodes of the network graph represent entities involved in the communications, and edges of the network graph represent the electronic communications between the entities.

In many situations, however, the overall graph generated for a given network of entities is quite large, often resulting in a bulky visual that is not easily analyzed or understood. In addition, generation of the overall network graph often takes a considerable amount of time and computing resources to generate. As one specific example, generating a network graph to visually represent electronic communications for 1000 entities may take several days. Consequently, traditional large network graphs are resource and time intensive to generate and often do not assist in the analysis of the overall network. As one specific example, an electronic transaction processing system (e.g., PayPal™) may process transactions for a large number of clients. In this specific example, a given client may initiate transactions with millions of different users per day. In some situations, the sheer size of the generated transaction network graph may render analysis impossible, preventing suspicious activity patterns within the network form being identified and mitigated. This, in turn, may lead to future suspicious (which may be malicious) transactions being allowed to proceed.

Even in situations in which a portion of an overall network graph is sampled, this portion of the overall network graph may still be on a scale that is not conducive to analysis or understanding of the interactions between the smaller sample of nodes. As one specific example, a one-hop communication network graph for 39 input nodes results in a network graph (shown in FIG. 5) with thousands of nodes and edges, which may not be easily understood by an analyst or even by a machine. In this example, an analyst viewing the portion of the overall network graph may have a queue of known problematic entities (e.g., suspicious suppliers, unresponsive servers, malicious users, etc.) or communications (e.g., suspicious transactions, dropped packages transmitted between two servers, messages that violate an ethics standard of a messaging platform, etc.) to analyze and is attempting to identify problematic communications or entities represented by other edges and nodes of the network that follow similar patterns to the known problematic communications or entities. In this example, however, the graph displaying the 39 nodes of the overall network graph may be difficult to glean useful patterns from due to the overall size and complexity of the network graph (as seen in FIG. 5).

In order to provide smaller scale visuals and to case analysis of large communication networks, the disclosed techniques generate a condensed version of a sampled portion of an overall network graph using multiple different clustering and summarization techniques. The disclosed techniques retrieve a network graph from a graph database and generate community graphs from a portion of the network graph that includes a set of target nodes. The set of target nodes includes nodes of interest (e.g., nodes corresponding to entities that are known to be problematic in some way). Generating the community graphs is performed such that respective community graphs include at least one target node and one or more other nodes connected to the target node by at least one edge (representing at least one electronic communication). The disclosed techniques assign the community graphs to various clusters based on their similarities to one another. For example, community graphs having similar structures (one or more matching nodes) are likely to be assigned to the same cluster. The disclosed techniques generate a closure graph for respective clusters by combining two or more community graphs in a given cluster. The closure graphs are then used to decide whether to perform preventative actions relative to entities that are represented by the one or more nodes. For example, if a closure graph indicates that nodes other than the target nodes have a similar pattern of activity (i.e., suspicious activity), then the disclosed techniques will take action to prevent the entities corresponding to these nodes from performing future problematic activity. As one specific example, if entities corresponding to a set of target nodes is known to participate in suspicious electronic transactions, then entities corresponding to other nodes in the closure graph having similar attributes to the target nodes will be restricted or blocked by the disclosed system.

The disclosed techniques may advantageously provide for quick generation of summarized network graphs using less resources (both computational and financial) relative to traditional network generation techniques. For example, traditionally, generating a transaction network graph for 1000 accounts requires approximately one to two days of processing and a large amount of computing resources to complete. In this example, in contrast to traditional techniques, the disclosed techniques may generate a closure graph from a portion of a network graph in approximately one to three seconds. Such techniques may advantageously increase the catch rate of electronic communication processing systems (e.g., increase the number of dropped, problematic, or suspicious communications identified and prevented by the system). Further, the disclosed techniques may advantageously decrease the amount of computing resources necessary to generate network graphs for identifying problematic electronic communications as well as decreasing loss (e.g., financial, user trust, etc.) associated with such communications.

Example Server System

FIG. 1 is a block diagram illustrating an example system configured to generate closure graphs. In the illustrated embodiment, system 100 includes graph database 150 and server system 120, which in turn includes graph module 140.

In the illustrated embodiment, server system 120 receives network data 102. In some embodiments, server system 120 retrieves network data 102 from graph database 150. For example, another server system may collect and store network data 102 in graph database 150 (or another database) and server system 120 retrieves this network data from the database. In other embodiments, network data is received by server system 120 directly from another server system included in system 100. For example, another server system may gather network data from a network of entities and transmit this network data to server system 120 e.g., in real-time (as the data is received at the other server system). The network data 102 in various embodiments may include recorded electronic communications, including one or more of the following types of electronic communication data: electronic transaction data, electronic messaging data (e.g., emails, text messages, social media interactions, etc. between two or more users), server data transmitted between two or more servers in a network of servers, cryptographic interactions (e.g., bitcoin transactions), etc.

Server system 120, in the illustrated embodiment, executes graph module 140, which includes community construction module 160, community clustering module 170, and cluster summary module 180. Graph module 140 in turn executes community construction module 160 to generate community graphs from one or more individual network graphs that include a set of target nodes representing target entities (e.g., accounts that are known to be suspicious). Entities represented by target nodes may also be referred to as seed entities. As one specific example, a target node may represent a seed account within a transaction network graph that has been identified as suspicious. In this example, the seed account may be fed into a queue of suspicious accounts requiring further analysis and investigation. Further in this example, other accounts associated with the seed account may also be analyzed using disclosed techniques e.g., to identify whether these associated accounts are also suspicious. Community construction module 160 may generate different types of community graphs based on which nodes it is centering the community around. For example, module 140 may generate either target node-centered communities or target node group-centered communities. Example types of community graphs are discussed in further detail below with reference to FIGS. 2A and 2B.

Community clustering module 170 receives the output of community construction module 160 and assigns different community graphs to various clusters. For example, community clustering module 170 assigns different community graphs generated by community construction module 160 to different clusters. Community clustering module 170 executes one or more clustering algorithms to generate clusters of community graphs. As discussed in further detail below with reference to FIGS. 3A and 3B, community clustering module 170 assigns community graphs having similar structure to the same cluster.

Cluster summary module 180 receives clusters of community graphs from community clustering module 170 and generates one or more closure graphs. For example, cluster summary module 180 may generate a closure graph for each cluster output by module 170. As one specific example, cluster summary module 180 may generate a closure graph for a cluster of two community graphs by combining nodes of the two community graphs that are the same to generate a single, condensed version of the two community graphs. In some embodiments, cluster summary module 180 also generates summary graphs for the one or more closure graphs. For example, cluster summary module 180 may generate one or more summary graph for each closure graph that it generates by selecting edges from a closure graph with frequencies higher than one or more predetermined thresholds. As one specific example, if an edge between two nodes of a closure graph has a frequency of 3 (e.g., this edge was present in three different community graphs of the cluster for which the closure graph was generated), then this edge will be included in the summary graph since it satisfies (i.e., meets) a predetermined frequency threshold of 2. Example closure graphs and summary graphs are discussed in further detail below with reference to FIGS. 4A-4C.

Cluster summary module 180 outputs one or more closure graphs 122, which server system 120 outputs to one or more processing systems. For example, server system 120 may send the cluster graphs 122 to another server system for analysis. As discussed in further detail below with reference to FIG. 5, server system 120 may input closure graphs or summary graphs into a machine learning model for further automatic pattern identification or may transmit the closure graphs or summary graphs to a computing device corresponding to a system administrator or analyst for further assessment. In some embodiments, server system 120 stores the one or more closure graphs 122 generated by cluster summary module 180 in graph database 150. For example, server system 120 may store closure graphs 122 in graph database 150 for retrieval and analysis at a later time. In other situations, server system 120 stores closure graphs 122 in a database other than graph database 150, such as a summary graph database as discussed in further detail below with reference to FIG. 5.

In some embodiments, a system other than server system 120 receives entity requests from various computing devices and stores raw data generated based on these requests (e.g., transaction, server, messaging, etc.) in graph database 150. For example, server system 120 may simply retrieve data from graph database 150 while another system other than system 120 stores and maintains data within database 150 based on the entity requests. An entity request may be a request to transmit data between two servers within a server network and another system may store data for this transmission in database 150. Further in this example, server system 120 is able to retrieve the data for the transmission (as well as other transmission data for this network) from graph database 150 for use in generating a server network graph, which in turn is stored in database 150. As new transmission requests are received, server system 120 may update a server network graph stored in graph database 150. For example, system 120 may generate a new edge (to represent a newly requested transmission) in the graph between a graph node representing the server associated with a request and another server included in the server network for which the graph is being updated.

Server system 120 may also receive requests for graph data from one or more computing devices. The device(s) may correspond to one or more analysts of server system 120. For example, an analyst computing device may monitor suspicious behavior and prevent suspicious (e.g., potentially fraudulent) activity. In such situations, the requests from analyst devices may include requests for graph data to be used to determine whether activity summarized e.g., in a graphical representation indicates that various transaction activity is suspicious (and potentially fraudulent). Analysts may utilize various machine learning or development tools to process data obtained from server system 120. As one specific example, internal PayPal development tools utilized by fraud agents may include a web user interface tool used to display graphical data received from system 120. Another service may be executed to illustrate a transaction network graph retrieved by server system 120 from graph database 150 or generated by system 120 based on data retrieved from database 150.

Graph database 150 may be implemented by system 100 as a relational or non-relational database (e.g., in order to store transaction data via a distributed, scalable, big data storage). As one specific example, the disclosed database management system may utilize an Apache Hbase™ datastore. Graph database 150 may be executed via Apache HBase™, Apache Cassandra™, Redis™, etc. For example, graph database 150 may include a plurality of different database regions (instances) maintained by a plurality of region servers. In some situations, the region servers are geographically distributed. Due to the ability to store data across multiple different regions, database 150 is able to store billions of rows of data and, thus, may be utilized in big data scenarios. The database regions that may be included in database 150 may be a contiguous, sorted range of rows that are stored together. Billions of rows of data may be split into hundreds, thousands, millions, etc. of regions. The database regions may be distributed evenly among various region servers.

In some embodiments, in addition to receiving or retrieving network data 102, server system 120 receives user requests from one or more user computing devices. These user requests may originate from various users of server system 120 and may initiate processing of electronic communications. For example, server system 120 may be a transaction processing system configured to process transactions requested by various users. In such situations, the user computing devices belong to individual users e.g., that have accounts with the transaction processing system and utilize transaction services provided by such a system. For example, user requests may include a request to initiate an electronic communication (e.g., a request to initiate a transaction). In this example, server system 120 determines whether to approve the initiated electronic communication. In order to make this determination, system 120 may generate a network graph and input a network graph into a machine learning model, where this network graph includes a node representing the user that submitted the request and prior electronic communications initiated by this user. In some situations, based on output of the machine learning model, system 120 generates and transmits a decision for the initiated electronic communication to the user computing device from which the request was received.

In this disclosure, various "modules" operable to perform designated functions are shown in the figures and described in detail (e.g., community construction module 160, community clustering module 170, cluster summary module 180, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

Example Community Construction Module

Figure 2A:
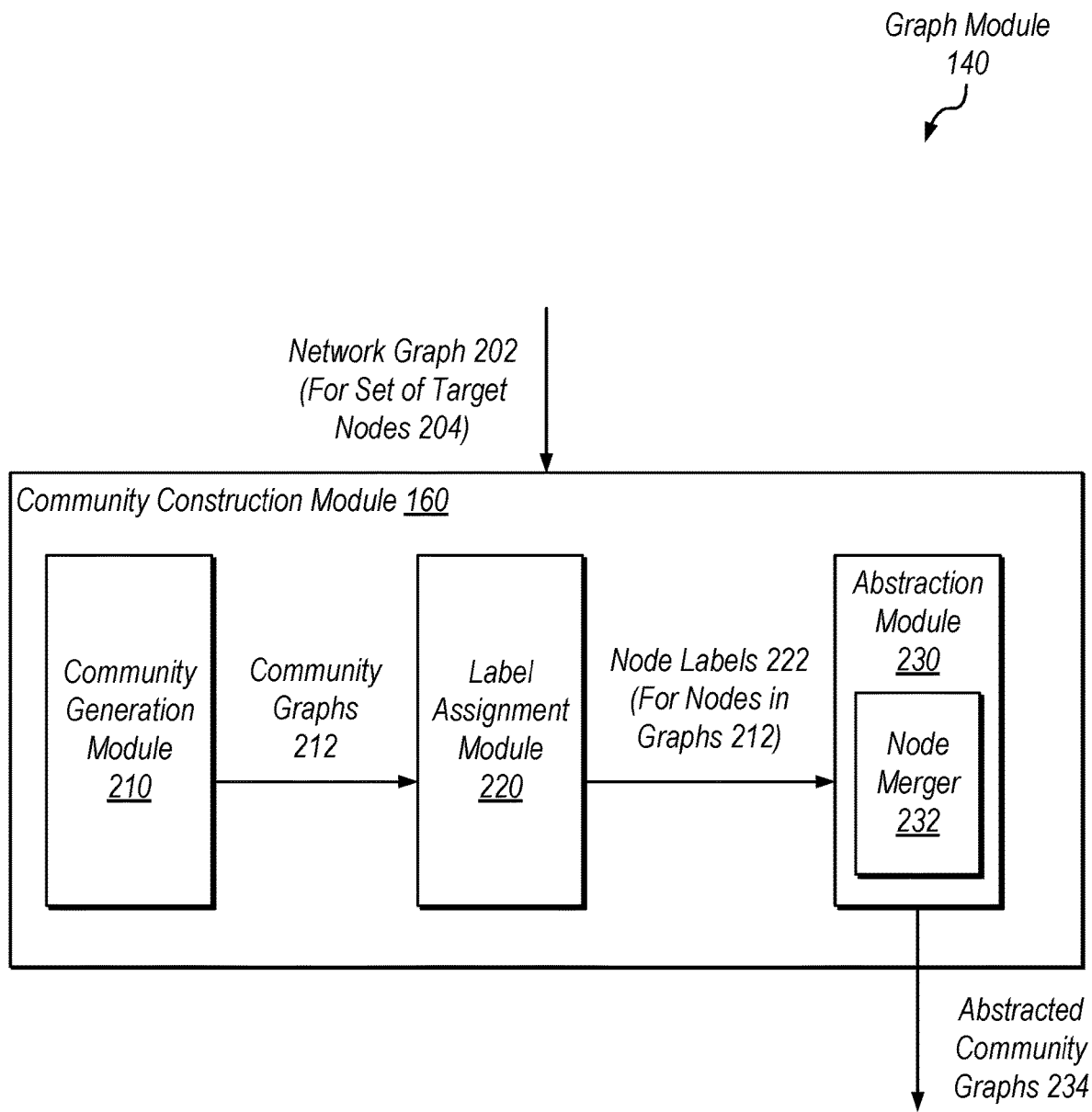
FIG. 2A is a block diagram illustrating an example community construction module, according to some embodiments.

Turning now to FIG. 2A, a block diagram is shown illustrating an example community construction module. In the illustrated embodiment, graph module 140 includes community construction module 160, which in turn includes community generation module 210, label assignment module 220, and abstraction module 230.

Community construction module 160, in the illustrated embodiment, receives a network graph 202 for a set 204 of target nodes that is either generated from raw network data 102 or retrieved from graph database 150 (shown in FIG. 1) by graph module 140. Community construction module 160 executes community generation module 210 to generate community graphs 212 for the set 204 of target nodes included in network graph 202. For example, community generation module 210 generates community graphs that are either target node-centered community graphs or target node group-centered community graphs. For example, both types of graphs are generated from nodes that are included in a portion of an overall network graph (retrieved from the graph database 150 shown in FIG. 1). The nodes that make up a target node-centered community graph include a single target node and one or more non-target nodes connected to the single target node. In contrast, the nodes that make up a target node group-centered community graph include one or more target nodes and one or more nodes connected to the one or more target nodes. Target node group-centered graphs that include two or more target nodes may also include connections between the two or more target nodes.

Label assignment module 220, in the illustrated embodiment, receives community graphs 212 from community generation module 210 and generates and assigns labels 222 to nodes of the community graphs 212. For example, label assignment module 220 may assign one or more of the following types of labels to the nodes of community graphs 212: target node, common high-degree node (e.g., a node representing a large entity corresponding to an amount of electronic communications above a communication threshold), common node (e.g., a node representing an account that consolidates funds from other accounts), sender node, receiver node, hybrid node (both sender and receiver), etc.

Figure 2B:
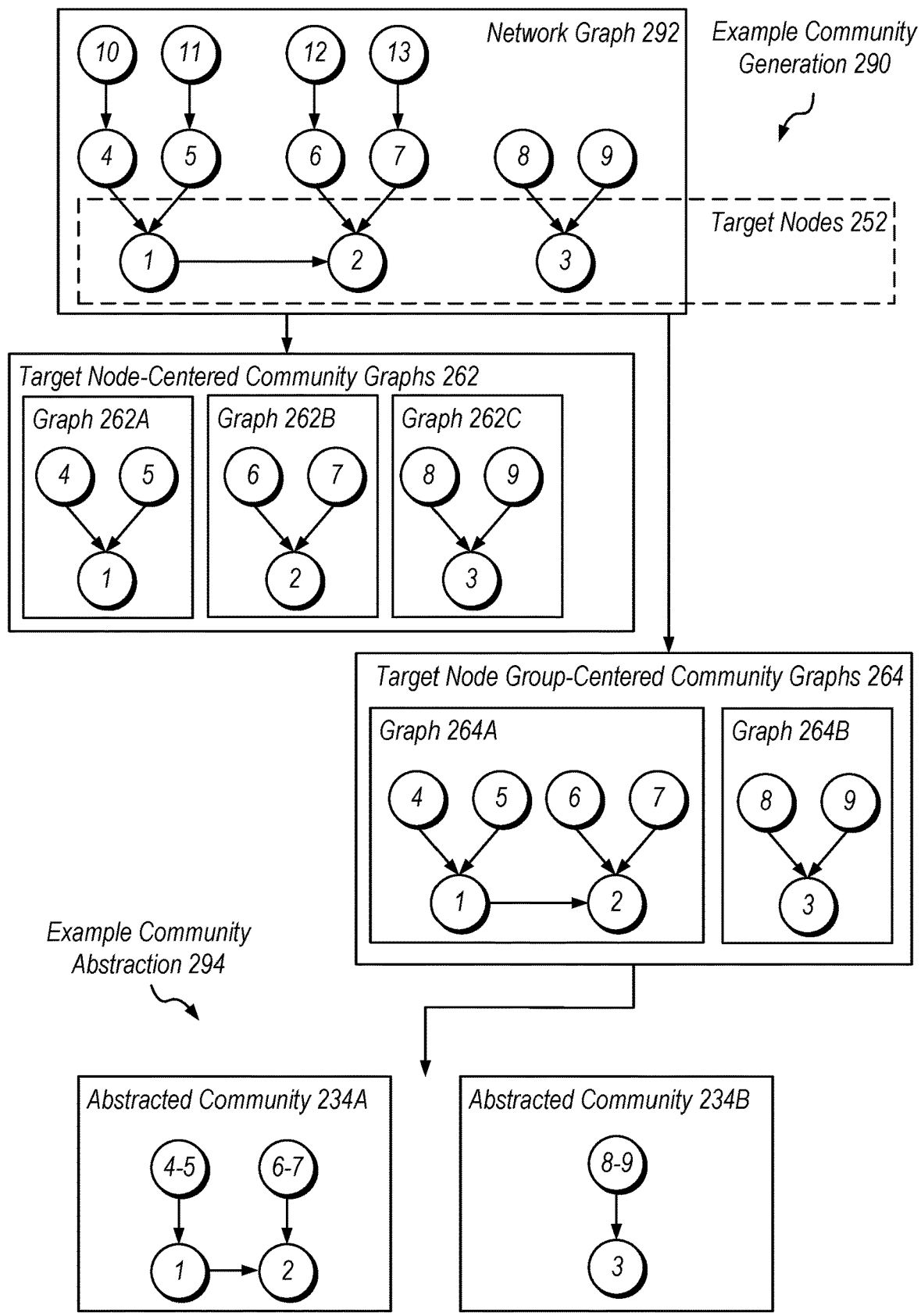
FIG. 2B is a block diagram illustrating example community graph generation, according to some embodiments.

Abstraction module 230, in the illustrated embodiment, receives node labels 222 from label assignment module 220. Abstraction module 230 also receives community graphs 212 from community generation module 210. Abstraction module 230 executes node merger 232 to simplify the community graphs 212 and outputs abstracted versions 234 of the community graphs 212. For example, node merger 232 is a module that merges nodes that are in the same neighborhood within a given community graph. FIG. 2B shows example abstracted versions 234 of two different community graphs 264A and 264B. The abstracted versions 234 of community graphs output by abstraction module 230 include the labels 222 assign by label assignment module 220 to various nodes within the community graphs.

FIG. 2B is a block diagram illustrating example community graph generation and abstraction. In the top portion of the illustrated embodiment, an example 290 in which various community graphs are generated by community construction module 160 is shown. The top portion of FIG. 2B shows an example network graph 292 with three different target nodes 252 highlighted, and a plurality of nodes connected to the three different target nodes 252. The nodes included in network graph 292 are numbers from 1-13, with the target nodes 252 being number 1, 2, and 3, respectively.

In FIG. 2B, the two boxes below the network graph 292 show examples of target node-centered community graphs 262 and examples of target node group-centered community graphs 264 generated from network graph 292. For example, the target node-centered community graphs 262 include three different graphs 262A, 262B, and 262C, generated based on each of the three target nodes 252 included in network graph 292. Each of these graphs also includes the non-target nodes from network graph 292 that are directly connected to the respective target nodes 252 via one or more edges. Community graph 262A, for example, includes target node 1, and nodes 4 and 5 which are directly connected to target node 1 and include edges pointing toward target node 1 indicating that the electronic communications are initiated at nodes 4 and 5 (e.g., sender nodes) and are communicated with target node 1 (e.g., a receiver node). Similarly, graph 262B includes target node 2 and connecting nodes 6 and 7, while graph 262C includes target node 3 and connecting nodes 8 and 9.

The example target node group-centered community graphs 264 shown in FIG. 2B include two graphs 264A and 264B which are generated based on groupings within the network graph. In this specific example, graph 264A includes two target nodes due to the one or more edges connecting these two target nodes 1 and 2 in network graph 292. Graph 264A also includes connecting nodes 4 and 5, and 6 and 7, connected to target nodes 1 and 2, respectively. In contrast, target node group-centered community graph 264B includes a single target node 3 due to this node lacking a connection to one or more other target nodes within network graph 292.

The bottom portion of FIG. 2B further illustrates an example 294 of community abstraction. In the illustrated embodiment, abstracted community graphs 234 generated from the target node group-centered community graphs 264 are shown. For example, abstracted community graph 234A shows a version of community graph 264A with two different merged nodes (e.g., connecting nodes 4 and 5 have been merged into a single node and connecting nodes 6 and 7 have been merged into a single node). Similarly, abstracted community graph 234B illustrates a version of community graph 264B with connecting nodes 8 and 9 merged. In various embodiments, the community graphs generated by community construction module 160 include target nodes and nodes which are directly connected to the target node via one or more edges. For example, community graphs do not include nodes from a network graph that are two or more hops removed from the target node (e.g., the community graphs do not include nodes 10, 11, 12, and 13 shown in network graph 292).

Example Community Clustering Module

Figure 3A:
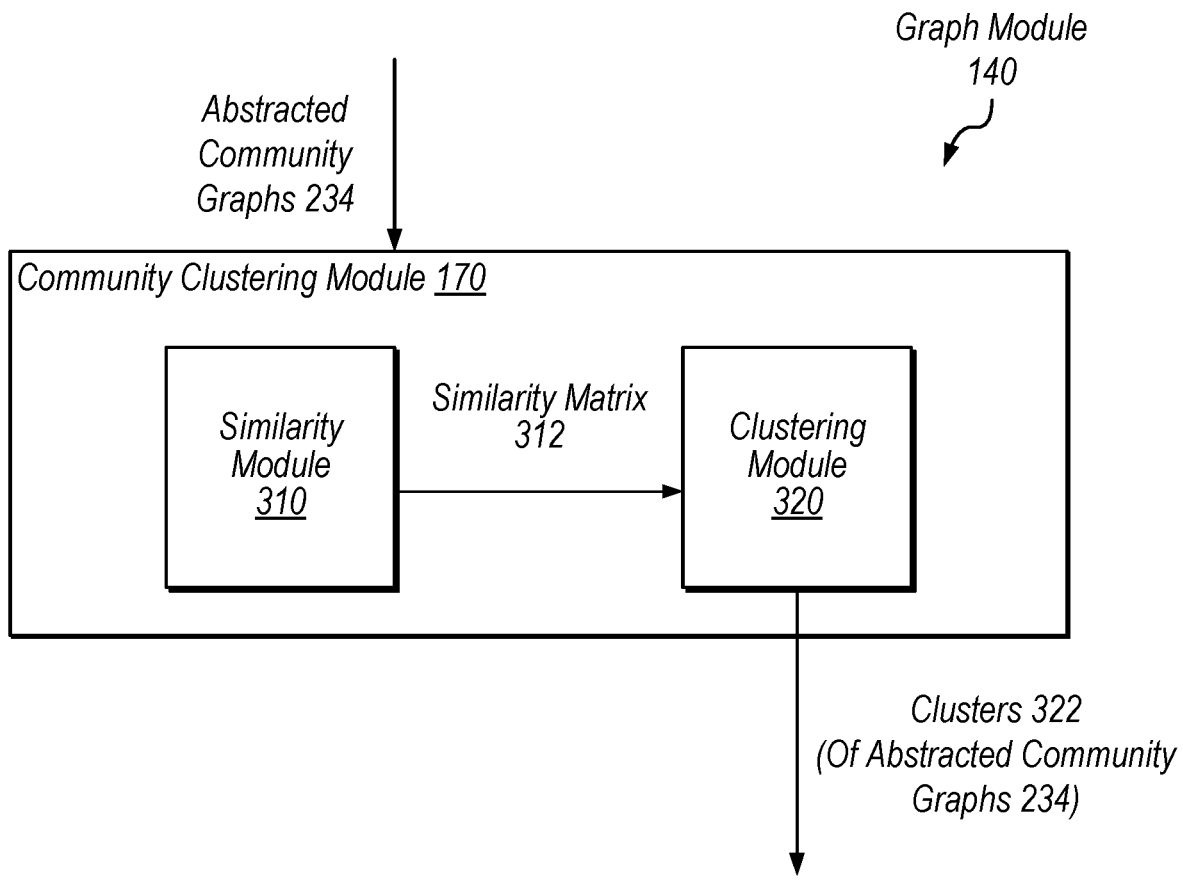
FIG. 3A is a block diagram illustrating an example community clustering module, according to some embodiments.

FIG. 3A is a block diagram illustrating an example community clustering module. In the illustrated embodiment, graph module 140 includes community clustering module 170, which in turn includes similarity module 310 and clustering module 320.

In the illustrated embodiment, community clustering module 170 receives abstracted community graphs 234 (e.g., from community construction module 160 shown in FIG. 2A). Community clustering module 170 inputs the abstracted community graphs 234 into similarity module 310. Similarity module 310 generates a similarity matrix 312 for the abstracted community graphs 234. The similarity matrix 312 output by similarity module 310 indicates the similarity between different pairs of abstracted community graphs 234. For example, if community clustering module 170 receives three different abstracted community graphs 234, similarity module 310 will calculate the similarity between the first community graph and the second community graph. Similarity module 310 will also calculate the similarity between the second community graph and the third community graph. Further, similarity module 310 will calculate the similarity between the first community graph and the third community graph. In some embodiments, similarity module 310 executes a shortest path kernel similarity algorithm to calculate values for the similarity matrix 312. In other embodiments, similarity module 310 uses various other types of similarity algorithms to calculate the similarity values stored in similarity matrix 312, such as a Euclidean distance algorithm, cosine Pearsons correlation coefficient algorithm, Dijkstra's algorithm, neighborhood hash kernel similarity, subgraph matching kernel similarity, pyramid match kernel similarity, etc.

Clustering module 320, in the illustrated embodiment, receives similarity matrix 312 from similarity module 310 and generates clusters 322 of abstracted community graphs 234 based on the similarity matrix. For example, clustering module 320 assigns abstracted community graphs 234 to various clusters based on the similarities between these graphs. Clustering module 320 may perform the clustering by inputting the similarity matrix 312 into one or more types of the following types of clustering algorithms: DBSCAN, HDBSCAN, k-medoids, k-means, mean shift, affinity propagation, a customized clustering algorithm (selected by an analyst of system 100), or any combination thereof.

FIG. 3B is a block diagram illustrating an example similarity calculation and cluster generation. In the illustrated embodiment, an example similarity calculation 350 is shown in the top portion of the figure, while example clusters 320, of community graphs 372 generated based on the example similarity matrix 352, are shown in the bottom portion of the figure. In some embodiments, community graphs 372 are abstracted community graphs. In other embodiments, community graphs 372 are not abstracted.

In the illustrated embodiment, an example similarity calculation 350 is performed on four different community graphs 372A-372D. For example, a similarity matrix 352 is generated in which different paired combinations of the four community graphs 372 are compared with one another to generate a similarity value. In the illustrated embodiment, similarity matrix 352 includes columns C1-C4 and rows C1-C4 representing community graphs 372A-372D, respectively. As one example of a similarity value calculation, the cell at the intersection of column C3 and row C1 in similarity matrix 352 stores the similarity value 0.5, indicating that community graph 372C (represented by C3) and community graph 372A (represented by C1) are 50% the same. This similarity value is calculated at example similarity calculation 362 by determining the number of occurrences of each type of edge i.e., community graph 372A includes a single edge from node "b" to node "a," and a single edge from node "c" to node "a." Then, based on the vector generated from the number of occurrences of each type of edge, example calculation 362 includes performing the cosine of the two vectors for the two community graphs 372A and 372C, which results in a similarity value of 0.5.

As another specific example (not shown in FIG. 3B), system 100 might analyze two community graphs 312A and 312B that include four different nodes with labels "a," "b," and "c." with nodes labeled "a" being target nodes. For example, community graph 312A includes a target node "a," two connecting "b" nodes, and one connecting "c" node. In contrast, community graph 312B includes a target node "a" and four different connecting nodes "b." Similarity module 310 (shown in FIG. 3A) determines that community graph 312A has two occurrences of an edge between a connecting node "b" and target node "a" and a single occurrence of an edge between connecting node "c" and target node "a" represented by vector [(b, a. 1.0): 2, (c, a, 1.0): 1]. Similarity module 310 also determines that community graph 312B has four occurrences of an edge between connecting node "b" and target node "a." This result is represented by vector [(b, a, 1.0): 4]. In this example, the similarity calculated for these two community graphs 312A and 312B will be cos([2, 1], [4, 1])=0.89, indicating that these two graphs are 89% similar.

Example clusters 320 are shown in the bottom portion of FIG. 3B. These clusters 320 are generated based on similarity matrix 352 shown in the upper portion of FIG. 3B. For example, cluster 322A is generated by clustering community graph 372A and community graph 372B together according to these graphs being 100% the same. Similarly, cluster 322B is generated by clustering community graph 372C and community graph 372D. In some embodiments, community clustering module 170 clusters community graphs together based on a similarity threshold. For example, community clustering module 170 compares the similarity values calculated using a clustering algorithm and stored in similarity matrix 352 with a predetermined similarity threshold. As one specific example, module 170 compares the values in similarity matrix 352 with a similarity threshold of 0.75. According to this comparison, the similarity values of 1 stored in the matrix satisfy the similarity threshold, while the values of 0.5 do not satisfy the similarity threshold. Thus, in this specific example, the community graphs resulting in respective similarity values that are above the similarity threshold are clustered together in respective clusters as shown at the bottom portion of FIG. 3B. In other embodiments, clustering module 170 determines which community graphs to cluster together using techniques other than a similarity threshold. For example, clustering module 170 may execute a density-based spatial clustering of applications with noise (DBscan) clustering algorithm.

Example Cluster Summary Module

Figure 4A:
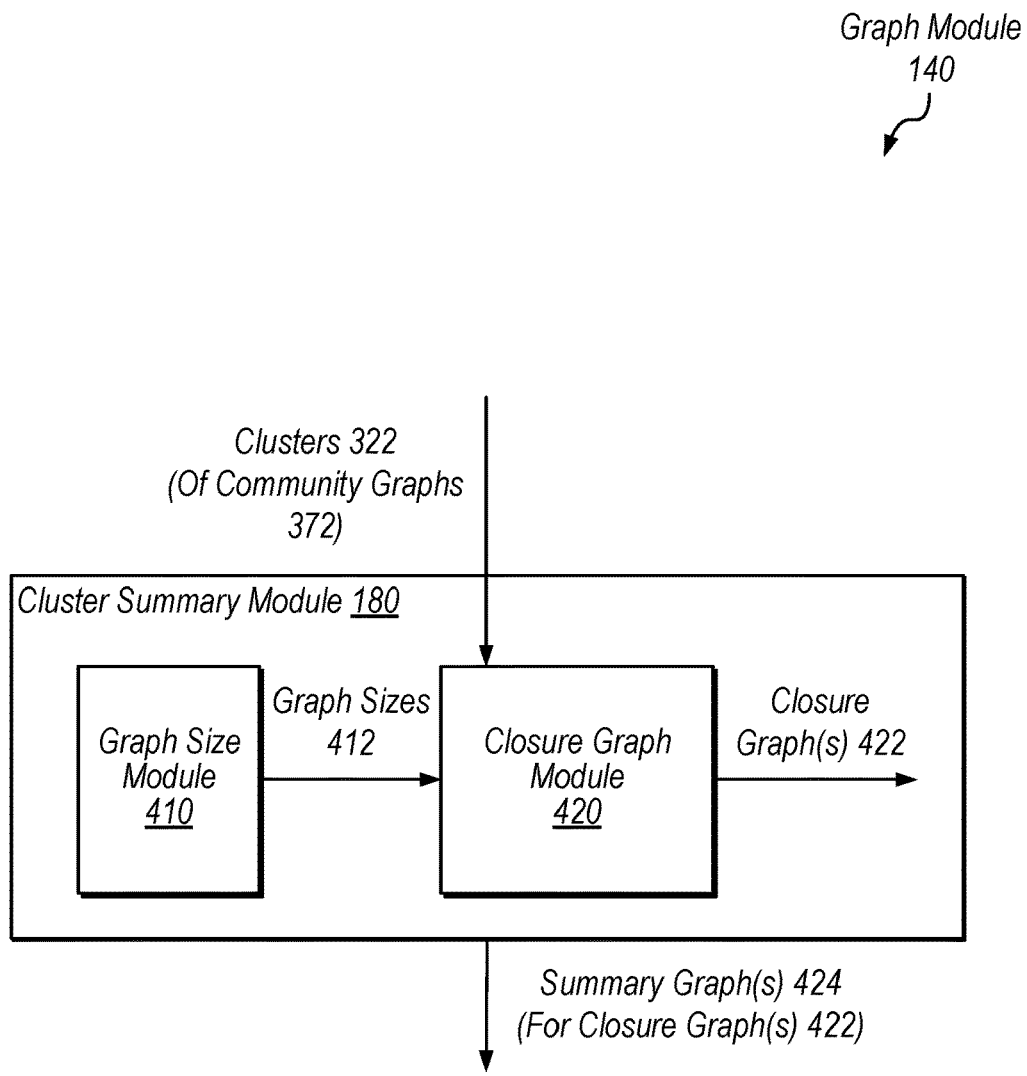
FIG. 4A is a block diagram illustrating an example cluster summary module, according to some embodiments.

FIG. 4A is a block diagram illustrating an example cluster summary module. In the illustrated embodiment, graph module 140 includes cluster summary module 180, which in turn includes graph size module 410 and closure graph module 420. Cluster summary module 180 receives clusters 322 of abstracted community graphs 234 from community clustering module 170 (shown in FIG. 3A) and generates one or more summary graphs 424.

Graph size module 410, in the illustrated embodiment, determines the sizes 412 of community graphs 372 included in clusters 322. For example, graph size module 410 determines a number of nodes and edges included in each of the community graphs 372 of clusters 322. The sizes determined by graph size module 410 may be used to determine a type of graph mapping algorithm to use when generating closure graph(s) for community graphs. As discussed above, in some embodiments, community graphs 372 are abstracted community graphs. For example, abstracted community graphs may be smaller in size (e.g., have less nodes or edges) than community graphs that have not been abstracted.

Cluster summary module 180, in the illustrated embodiment, inputs the determined graph sizes 412 and the clusters 322 of community graphs 372 into closure graph module 420. Closure graph module 420 generates one or more closure graphs 422 from the community graphs 372 included in the clusters 322. Prior to generating a closure graph 422 for a cluster 322 of community graphs, closure graph module 420 selects a graph mapping algorithm based on the sizes of the community graphs included in the cluster. For example, if cluster 322 includes two different community graphs that are both smaller than a graph size threshold, closure graph module 420 selects an accurate graph mapping algorithm to generate a closure graph 422 for this cluster 322. In this example, if the two community graphs have a number of nodes less than or equal to 30 nodes, then closure graph module 420 selected an accurate mapping algorithm to generate a closure graph for the two community graphs. As another example, if at least one of the two different community graphs is larger than a graph size threshold, closure graph module 420 selects an approximated mapping algorithm. For example, closure graph module 420 might select an approximated mapping algorithm to further simplify community graphs to make the closure graph generation faster. As one specific example, closure graph module 420 might select a neighbor biased mapping (NBM) algorithm.

Cluster summary module 180, in the illustrated embodiment, further generates one or more summary graphs 424 for the one or more closure graphs 422 output by closure graph module 420. For example, cluster summary module 180 may set different selection thresholds to capture the common structures (i.e., nodes) from closure graphs to generate a summary graph. As discussed in further detail below with reference to FIG. 4B, cluster summary module 180 selects different edge frequency thresholds for which to simplify closure graphs when generating summary graphs.

Figure 4B:
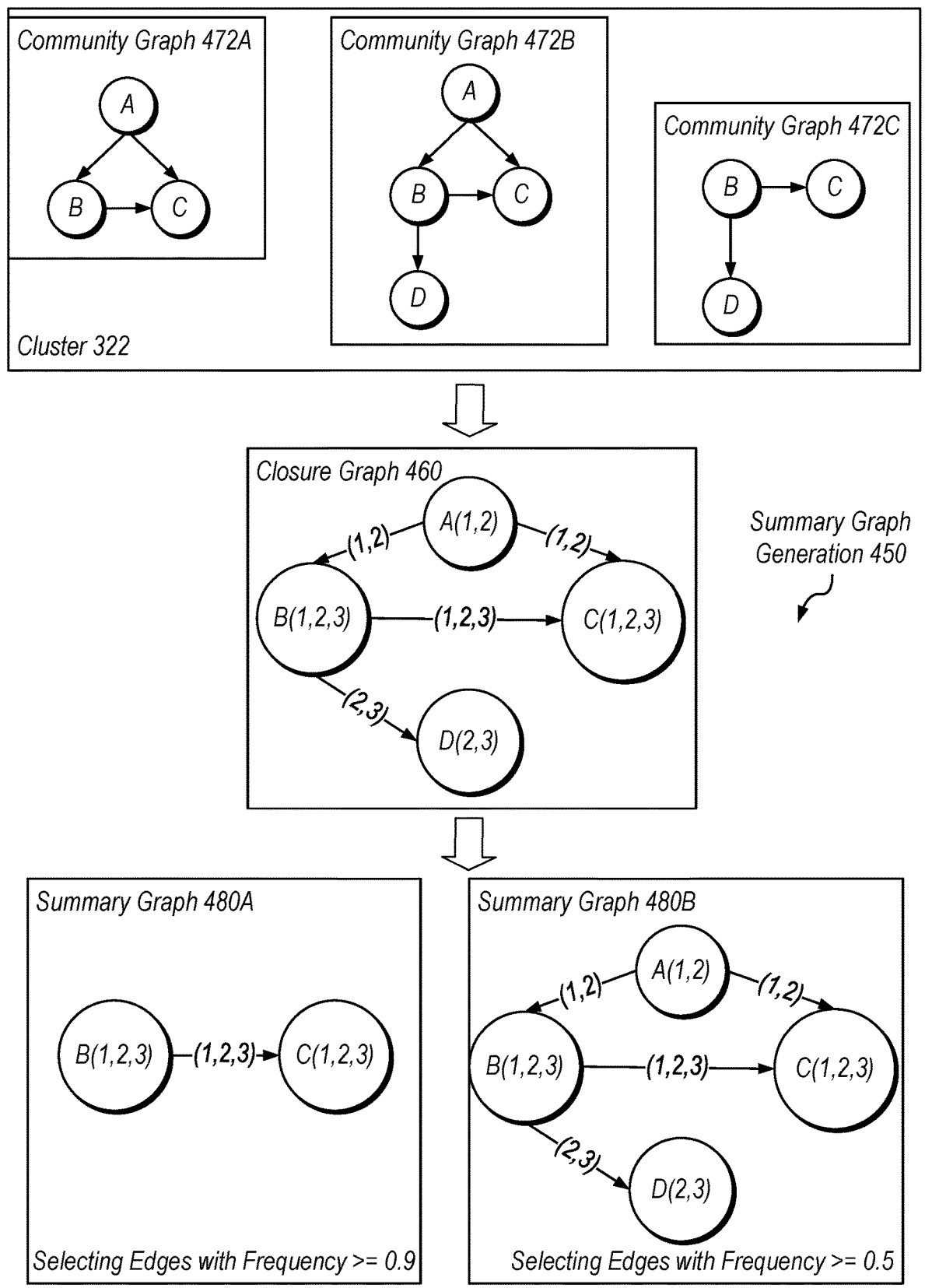
FIG. 4B is a block diagram illustrating example summary graph generation, according to some embodiments.

FIG. 4B is a block diagram illustrating example summary graph generation. In the illustrated embodiment, an example 450 generation of summary graphs for two different clusters is shown. In the illustrated embodiment, example summary graphs 480 are generated from community graphs 472 included in a cluster 322. For example, community graph 472A includes three nodes A, B, and C, with a single edge between each of the three nodes. Community graph 472B includes four nodes, A, B, C, and D, with various nodes between them. Community graph 472C includes three nodes, B, C, and D, with a single edge between each of nodes B and C, and B and D.

In the illustrated embodiment, a closure graph 640 is shown that was generated by closure summary graph module 180 for cluster 322 based on the nodes and edges included in community graphs 472A-472C. For example, closure graph 460 includes a single node for each of the four nodes included in community graphs 472A-472C (i.e., nodes A, B, C, and D). The nodes included in closure graph 460 include different numbers indicating the graph identifier of the community graph in which this node is included. For example, node A includes graph identifiers 1 and 2 indicating that this node is included in community graph 472A and community graph 472B. The edges included in closure graph 460 include different numbers indicating the graph identifier of the community graph to which the edge corresponds. For example, the edge between nodes B and C includes graph identifiers 1, 2, and 3 indicating that this edge is included in each of the three community graphs 472A, 472B, and 472C.

Two different example summary graphs 480A and 480B are shown in FIG. 4B, both generated from closure graph 460 according to two different edge frequency thresholds. For example, summary graph 480A is generated according to an edge frequency threshold of 0.9. In this example, summary graph 480A includes only edges from closure graph 460 with a frequency greater than 0.9. Accordingly, the edge between nodes B and C in closure graph 460 is included in summary graph 480A based on this edge being present in all three of the community graphs 472. That is, the edge between nodes B and C is present in greater than 90% of the community graphs 472. Similarly, summary graph 480B includes all of the edges from closure graph 460 as well as their corresponding nodes, based on each of these edges being present in at least 50% of the community graphs 472. For example, the edge between nodes A and B in closure graph 460 is present in two of the three community graphs, meaning that this edge has a frequency of 2 out of 3; thus, the edge between nodes A and B occurs in more than 50% of the community graphs.

Example Network and Summary Graphs

FIG. 5 is a diagram illustrating an example summary graph and summary data. In the illustrated embodiment, an example network graph 510 is shown in the top portion of FIG. 5, while an example summary graph 520 and summary data 540 is shown in the bottom portion of FIG. 5 including a table 530 storing target nodes properties determined for the summary graph 520.

The example network graph 510 shown in the illustrated embodiment is a one-hop transaction network graph for 39 input accounts (which are represented via 39 target nodes within network graph 510), including the various connecting nodes that are within one hop (one or less nodes removed from the target nodes). As discussed above, the complexity of example network graph 510 and the crowded nature of the number of nodes and edges in the graph make it difficult to visually analyze as well as time consuming and computationally intensive to automatically analyze e.g., via machine learning techniques. As such, the disclosed techniques provide various graph processing and summarization operations to simplify and provide focused details for a network graph of target nodes.

The summary graph 520 and summary data 540 is one example of the output provided by the disclosed techniques for the example network graph 510. For example, summary graph 520 includes five different nodes: A, B, C, D, and E. Node A is a target node, node B represents a large account, node C is a sender entity of size three, node D also represents a large account, and node E is a receiver entity of size five. Node B, for example, might represent the PayPal Crypto Exchange™, while node C indicates that on average seed accounts represented by the 39 target nodes send funds to three other accounts. Summary data 540 indicates common attributes for the accounts represented by the nodes of the summary graph 520. This information allows an analyst or machine learning model to determine if other nodes connected to the target nodes have similar patterns of activity to the target nodes. This pattern information may indicate that the accounts represented by these other nodes (having similar patterns to the target nodes) are also suspicious and necessitate preventative actions.

Summary table 530, in the illustrated embodiment includes various properties of the summary graph 520. For example, table 530 includes a cluster identifier (ID) indicating that the summary graph 520 is included in cluster 1 based on the execution of community clustering module 170 (shown in FIGS. 1 and 3A). Further, table 530 indicates that example summary graph 520 is generated based on a total of 39 target nodes and that 89.66% of the target nodes summarized in summary graph are unverified (e.g., the account corresponding to these target nodes have not been verified to confirm that they are not suspicious. Further, table 530 indicates that 100% of the target nodes summarized in summary graph 520 correspond to an account with the US country code and have an account name present. Still further, table 530 indicates that 100% of the accounts represented by the target nodes in graph 520 are not new accounts. Further in this example, 82.76% of the transactions represented by edges of summary graph 520 are person-to-person transactions. Table 530 further indicates that 93.1% of the accounts represented by target nodes summarized in graph 520 are unlocked accounts (i.e., these accounts have not been locked to prevent further account activity).

In some embodiments, in addition to storing network graphs 510 in graph database 150 (shown in FIG. 1), system 100 stores summary graph 520 and summary data 540. For example, system 100 may store summary graph 520 and summary data 540 (such as table 530) in a summary database or in graph database 150 in addition to network graphs 510. Further in this example, system 100 may store various community graphs, clusters, closure graphs, and summary graphs in either a summary database or graph database 150.

Example Electronic Communication Processing

Figure 6:
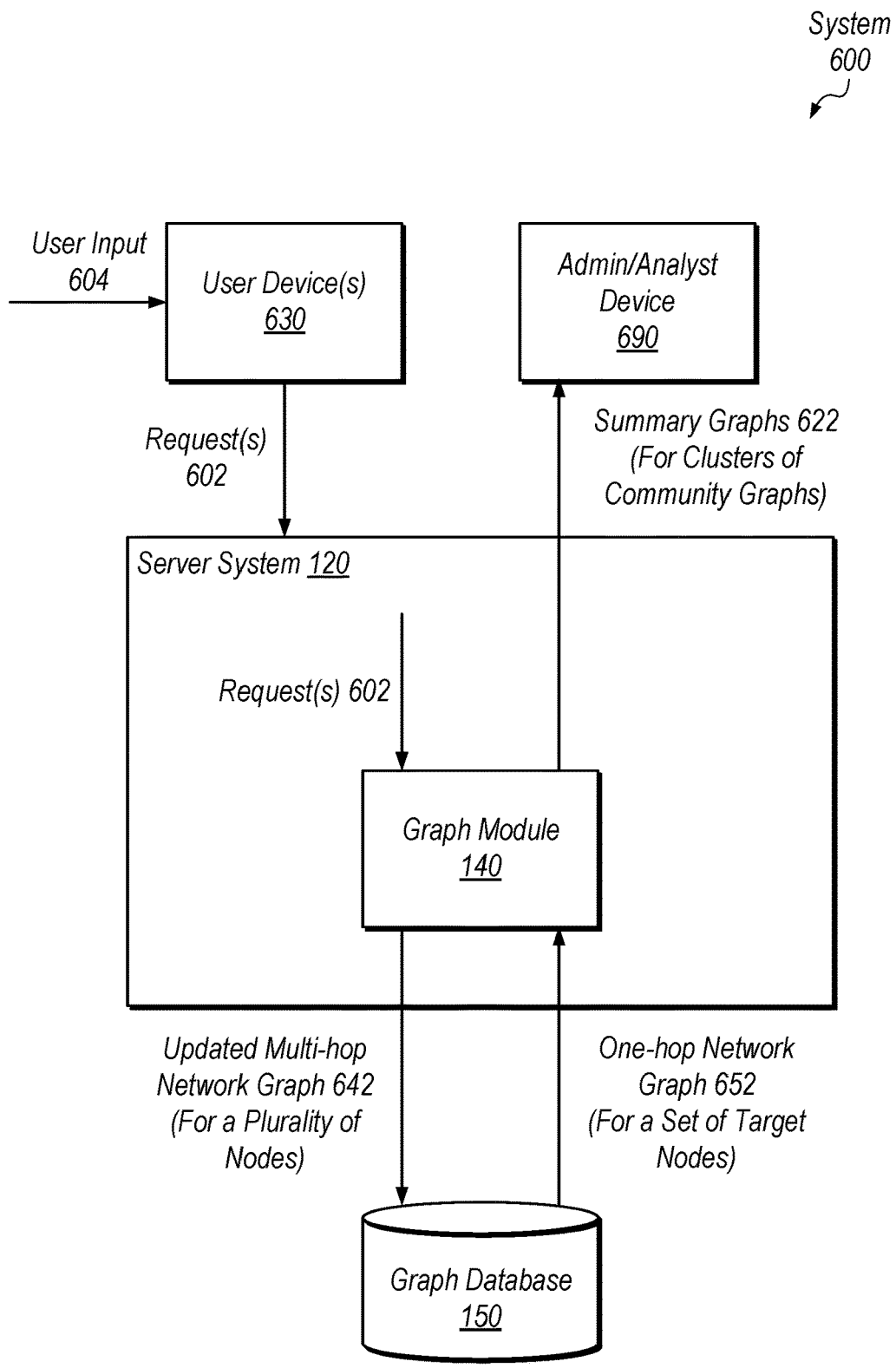
FIG. 6 is a block diagram illustrating example processing of an electronic communication request using summary graphs, according to some embodiments.

Turning now to FIG. 6, a block diagram is shown illustrating example processing of an electronic communication request using summary graphs. In the illustrated embodiment, system 600 includes one or more user devices 630, an administrator/analyst device 690, graph database 150, server system 120, which in turn includes graph module 140.

The one or more user devices 630, in the illustrated embodiment, receive user input 604 and submit one or more requests 602 to server system 120 based on the user input. For example, a user may request to initiate an electronic communication via an application at their user device 630 and user device 630 submits a request to authorize the requested electronic transaction based on the user input. In this example, the request 602 may be a request to authorize processing of user data by a server of a server network, a request to authorize processing of an electronic transaction (e.g., between the requesting user and another user), a request to send an electronic message via a social media platform, etc.

Server system 120, in the illustrated embodiment, processes the request(s) 602 using graph module 140 as discussed above with reference to FIGS. 1-4B. For example, graph module 140 may determine whether requests (or the entities associated with the requests) to process data via a server network, to process a transaction via a transaction processing system, to communicate electronic messages to various other users via a messaging platform, etc. are suspicious (or even malicious). As one specific example, server system 120 may determine to perform one or more preventative actions against an account requesting to process an electronic transaction based on identifying this account as suspicious in response to identifying that this account has similar activity patterns to other known suspicious accounts represented in a summary graph generated from a network graph that includes nodes representing the account and other known suspicious (seed) accounts. For example, server system 120 may revoke access privileges of this account or may block future electronic transactions initiated from this account in response to identifying that this account is suspicious according to a summary graph. As another example, server system 120 may identify that a given server in a server network is currently down, overloaded, or malfunctioning, server system 120 may shut down this server or remove it from a pool of servers available to handle requests to process user data.

In the illustrated embodiment, server system 120 stores updated versions of multi-hop transaction network graphs 642 for a plurality of different nodes in graph database 150. For example, in addition to generating summary graphs, graph module 140 generates or updates large network graphs including any of various numbers of nodes. Graph module 140 also retrieves a one-hop network graph 652 from graph database 150 that is a portion of the overall multi-hop network graph 642 updated and stored by graph module 140 in graph database 150. Graph module 140 utilizes the retrieved one-hop network graph 652 for a set of target nodes to generate summary graphs 622 using the techniques discussed above with reference to FIGS. 1-5.

In some embodiments, server system 120 executes a machine learning model in addition to executing graph module 140 when determining whether to authorize various requests 602. For example, server system 120 may determine whether nodes other than target nodes included in a summary graph also represent suspicious entities. If the other nodes represent suspicious entities, server system 120 may automatically perform preventative actions. In other embodiments, the summary graphs 622 generated for various clusters of community graphs by server system 120 are sent directly to the admin/analyst device 690 for analysis by a system administrator to determine whether system 120 should perform preventative actions. The machine learning model used by graph module 140 to determine whether to perform preventative actions receives one or more summary graphs 622 from graph module 140 as input and outputs information indicating whether or not nodes included in the summary graphs represent suspicious entities. Server system 120 may train the machine learning model using a plurality of different summary graphs for which the suspiciousness status of the nodes in the summary graphs are known in order to alter weights of the machine learning model during training (e.g., based on whether the model correctly identifies nodes representing suspicious or problematic entities).

Example Method

FIG. 7 is a flow diagram illustrating a method for generating closure graphs for use in determining to perform preventative actions relative to entities represented via nodes of the closure graph, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, server system 120 performs the elements of method 700.

At 710, in the illustrated embodiment, a server system retrieves, from a graph database storing a network graph representing a plurality of electronic communications, a portion of the network graph that includes a set of target nodes. For example, as discussed above with reference to FIG. 1, server system 120 either receives network data 102 from another server system or may retrieves network data 102 from a graph database (e.g., graph database 150). In some embodiments, the set of target nodes represents electronic communications for a set of target entities, wherein the plurality of electronic communications are between a plurality of different entities, wherein the plurality of different entities are represented via nodes of the network graph, and wherein the electronic communications between the plurality of different entities are represented via edges of the network graph. In some embodiments, the electronic communications represented in the network graph are electronic transactions between entities of a transaction processing system. In some embodiments, the electronic communications represented in the network graph are data transmissions between servers of a network of servers.

At 720, in the illustrated embodiment, the server system generates, based on the target nodes included in the portion of the network graph, community graphs, where respective community graphs include at least a target node and one or more nodes connected to the target node. For example, as discussed above with reference to FIG. 2A, graph module 140 of server system 120 executes community construction module 160 to generate community graphs 212 for a network graph 202 that includes a set 204 of target nodes. In some embodiments, generating the community graphs is performed to generate target node-centered community graphs of nodes included in the portion of the network graph, where a target node-centered community graph includes a single target node and one or more nodes connected to the single target node. In some embodiments, generating the community graphs is performed to generate target node group-centered community graphs of nodes included in the portion of the network graph, and wherein a target node group-centered community graph includes one or more target nodes and one or more nodes connected to the one or more target nodes, and wherein target node group-centered community graphs including at least two target nodes include a connection between the at least two target nodes.

In some embodiments, generating the community graphs further includes automatically labeling, using a machine learning model, respective nodes included in the portion of the network graph, where the machine learning model is trained to automatically label nodes according to a set of predetermined labels indicating attributes of entities represented by a corresponding node. In some embodiments, the community graphs are generated based on labels automatically assigned to nodes included in the portion of the network graph.

At 730, in the illustrated embodiment, the server system assigns, based on similarities between the community graphs, the community graphs to one or more clusters. For example, as discussed above with reference to FIG. 3A, graph module 140 of server system 120 executes community clustering module 170 to generate clusters 322 of abstracted community graphs 234. In some embodiments, the similarities between the community graphs are determined based on generating a similarity matrix, wherein the similarity matrix includes values indicating a similarity between different pairs of graphs included in the community graphs. In some embodiments, assigning the community graphs to clusters is performed by inputting the similarity matrix into a clustering algorithm.

At 740, in the illustrated embodiment, the server system generates a closure graph for respective clusters, including combining two or more community graphs within respective clusters. As discussed above with reference to FIG. 4A, graph module 140 of server system 120 executes a cluster summary module 180 to generate one or more closure graphs 422. In some embodiments, generating a closure graph for a given cluster includes identifying a duplicate node that is included in two or more community graphs within the given cluster and representing the duplicate node within the closure graph using identifiers corresponding to the two or more community graphs within the given cluster. In some embodiments, generating the closure graph for the given cluster further includes representing edges between the duplicate node and one or more other nodes using a number of communications occurring between the duplicate node and the one or more other nodes according to a number of communications occurring between the duplicate node and the one or more other nodes in the two or more community graphs. In some embodiments, generating closure graphs for respective clusters includes determining a size of graphs included in the respective clusters and executing, based on respective determined sizes, ones of a plurality of types of graph mapping algorithms that correspond to the respective determined sizes.

At 750, in the illustrated embodiment, the server system performs, based on respective closure graphs, one or more preventative actions relative to one or more entities represented by one or more nodes included in respective closure graphs and connected to the target node. For example, as discussed above with reference to FIG. 6, server system 120 may perform one or more preventative actions based on generating summary graphs 622 or may transmit the summary graphs 622 to an admin/analyst device 690 for analysis. In this example, server system 120 may perform one or more preventative actions based on feedback received from device 690, which in turn is based on summary graph 622. In some embodiments, performing the one or more preventative actions is further based on generating a summary graph for respective closure graphs. In some embodiments, generating the summary graph is performed according to an edge frequency threshold that specifies a number of times an edge must appear within the closure graphs to be included in the summary graph.

In some embodiments, performing the one or more preventative actions is further based on generating a summary graph for respective closure graphs and inputting the summary graph into a machine learning trained to automatically determine whether nodes connected to the target nodes in the summary graph have similar attributes to the target nodes. In some embodiments, performing the one or more preventative actions is further based on identifying one or more patterns within respective closure graphs. In some embodiments, performing the one or more preventative actions includes identifying one or more suspicious entities represented by target nodes in of the closure graphs and revoking one or more privileges of the one or more suspicious entities within a network represented by the network graph. In some embodiments, performing the one or more preventative actions is further based on identifying one or more patterns within respective closure graphs, and wherein performing the one or more preventative actions includes preventing an entity represented by a target node included in one of the closure graphs from performing further electronic communications.

Example Computing Device

Figure 8:
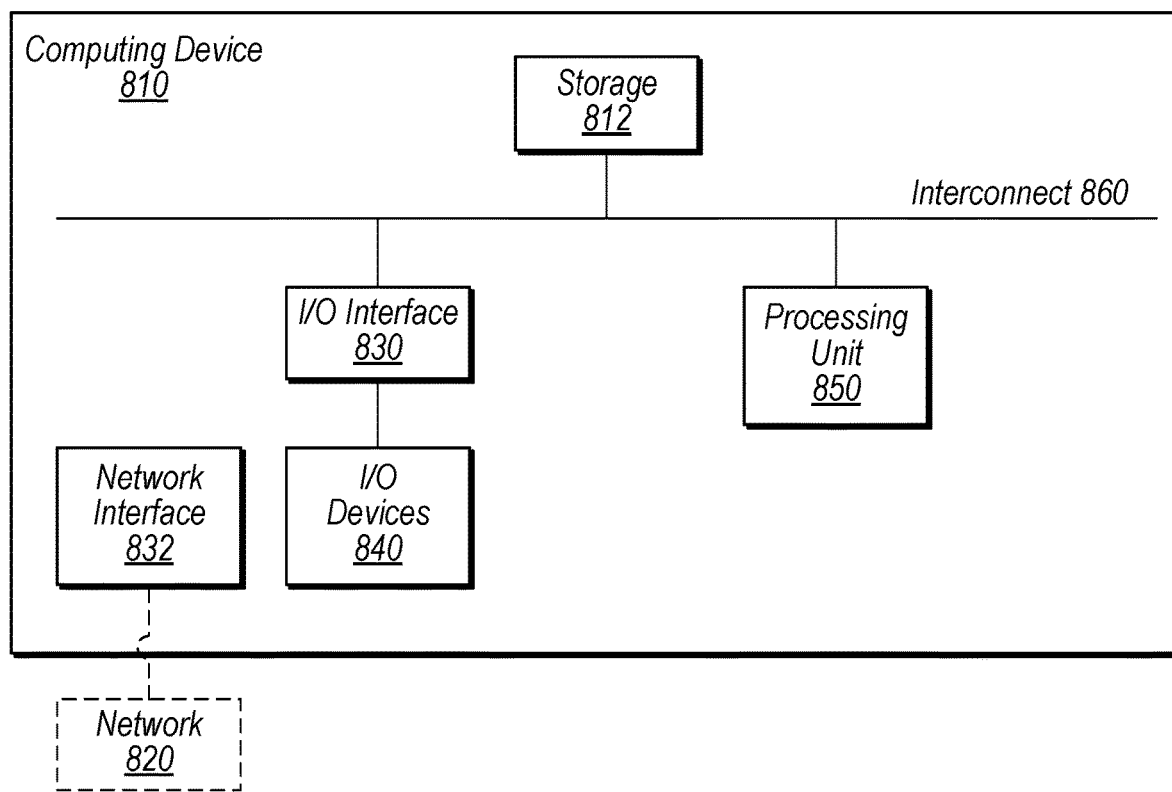
FIG. 8 is a block diagram illustrating an example computing device, according to some embodiments.

Turning now to FIG. 8, a block diagram of one embodiment of computing device 810 (which may also be referred to as a computing system) is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. The server system 120 shown in FIG. 1 and discussed above is one example of computing device 810. As shown, computing device 810 includes processing unit 850, storage 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 812 may consist solely of volatile memory, in one embodiment. Database 150, discussed above with reference to FIG. 1 is one example of storage subsystem 812. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages.

Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
retrieving, by a server system from a graph database storing a network graph representing a plurality of electronic communications, a portion of the network graph that includes a set of target nodes;
generating, by the server system based on the target nodes included in the portion of the network graph, community graphs, wherein respective community graphs include at least a target node and one or more nodes connected to the target node;
assigning, by the server system based on similarities between the community graphs, the community graphs to one or more clusters;
generating, by the server system, a closure graph for respective clusters, including combining two or more community graphs within respective clusters, wherein generating a closure graph for a given cluster includes:
identifying a duplicate node that is included in two or more community graphs within the given cluster; and
representing the duplicate node within the closure graph using identifiers corresponding to the two or more community graphs within the given cluster; and
combining at least two of the closure graphs to generate a summary graph that includes a matching node that is present in both of the closure graphs, wherein the matching node within the summary graph includes identifiers corresponding to the at least two closure graphs; and
performing, by the server system based on respective closure graphs, one or more preventative actions relative to one or more entities represented by one or more nodes included in respective closure graphs and connected to the target nodes.

2. The method of claim 1, wherein the set of target nodes represents electronic communications for a set of target entities, wherein the plurality of electronic communications are between a plurality of different entities, wherein the plurality of different entities are represented via nodes of the network graph, and wherein the electronic communications between the plurality of different entities are represented via edges of the network graph.

3. The method of claim 1, wherein generating the closure graph for the given cluster further includes:

representing edges between the duplicate node and one or more other nodes using a number of communications occurring between the duplicate node and the one or more other nodes according to a number of communications occurring between the duplicate node and the one or more other nodes in the two or more community graphs.

4. The method of claim 1, wherein the electronic communications represented in the network graph are electronic transactions between entities of a transaction processing system.

5. The method of claim 1, wherein generating the community graphs is performed to generate target node-centered community graphs of nodes included in the portion of the network graph, wherein a target node-centered community graph includes a single target node and one or more nodes connected to the single target node.

6. The method of claim 1, wherein generating the community graphs further includes:
automatically labeling, using a machine learning model, respective nodes included in the portion of the network graph, wherein the machine learning model is trained to automatically label nodes according to a set of predetermined labels indicating attributes of entities represented by a corresponding node, and wherein the community graphs are generated based on labels automatically assigned to nodes included in the portion of the network graph.

7. The method of claim 1, wherein performing the one or more preventative actions is further based on identifying one or more patterns within respective closure graphs, and wherein performing the one or more preventative actions includes:
identifying one or more suspicious entities represented by target nodes in the closure graphs; and
revoking one or more privileges of the one or more suspicious entities within a network represented by the network graph.

8. The method of claim 1, wherein the similarities between the community graphs are determined based on generating a similarity matrix, wherein the similarity matrix includes values indicating a similarity between different pairs of graphs included in the community graphs, wherein assigning the community graphs to clusters is performed by inputting the similarity matrix into a clustering algorithm.

9. A non-transitory computer-readable medium having instructions stored thereon that are executable by a server system to perform operations comprising:
retrieving, from a graph database storing a network graph representing a plurality of electronic communications, a portion of the network graph that includes a set of target nodes;
generating, based on the target nodes included in the portion of the network graph, community graphs, wherein respective community graphs include at least a target node and one or more nodes connected to the target node;
assigning, based on similarities between the community graphs, the community graphs to one or more clusters;
generating a closure graph for respective clusters, including combining two or more community graphs within respective clusters, wherein generating a closure graph for a given cluster includes:
identifying a duplicate node that is included in two or more community graphs within the given cluster; and
representing the duplicate node within the closure graph using identifiers corresponding to the two or more community graphs within the given cluster; and
combining at least two of the closure graphs to generate a summary graph that includes a matching node that is present in both of the closure graphs, wherein the matching node within the summary graph includes identifiers corresponding to the at least two closure graphs; and
performing, based on the summary graph, one or more preventative actions relative to one or more entities represented by one or more nodes included in respective closure graphs and connected to the target nodes.

10. The non-transitory computer-readable medium of claim 9, wherein generating the closure graph for the given cluster further includes:
representing edges between the duplicate node and one or more other nodes using a number of communications occurring between the duplicate node and the one or more other nodes according to a number of communications occurring between the duplicate node and the one or more other nodes in the two or more community graphs.

11. The non-transitory computer-readable medium of claim 9, wherein the electronic communications represented in the network graph are data transmissions between servers of a network of servers.

12. The non-transitory computer-readable medium of claim 9, wherein generating the community graphs is performed to generate target node group-centered community graphs of nodes included in the portion of the network graph, and wherein a target node group-centered community graph includes one or more target nodes and one or more nodes connected to the one or more target nodes, and wherein target node group-centered community graphs including at least two target nodes include a connection between the at least two target nodes.

13. The non-transitory computer-readable medium of claim 9, wherein generating the summary graph is performed according to an edge frequency threshold that specifies a number of times an edge must appear within the closure graphs to be included in the summary graph.

14. The non-transitory computer-readable medium of claim 9, wherein generating closure graphs for respective clusters includes:
determining a size of graphs included in the respective clusters; and
executing, based on respective determined sizes, ones of a plurality of types of graph mapping algorithms that correspond to the respective determined sizes.

15. A system, comprising:
a processor; and
a non-transitory computer-readable medium having stored thereon instructions that are executable by the processor to cause the system to perform operations comprising:
retrieving, from a graph database storing a graph representing a plurality of electronic communications, a portion of the graph that includes a set of target nodes;
generating, based on the target nodes included in the portion of the graph, community graphs, wherein respective community graphs include at least a target node and one or more nodes connected to the target node;
assigning, based on similarities between the community graphs, the community graphs to one or more clusters;

generating a closure graph for respective clusters, including combining two or more community graphs within respective clusters, wherein generating a closure graph for a given cluster includes:

identifying a duplicate node that is included in two or more community graphs within the given cluster; and representing the duplicate node within the closure graph using identifiers corresponding to the two or more community graphs within the given cluster; and combining at least two of the closure graphs to generate a summary graph that includes a matching node that is present in both of the closure graphs, wherein the matching node within the summary graph includes identifiers corresponding to the at least two closure graphs; and performing, based on respective closure graphs, one or more preventative actions relative to one or more entities represented by one or more nodes included in respective closure graphs and connected to the target nodes.

16. The system of claim 15, wherein generating the community graphs further includes:

automatically labeling, using a machine learning model, respective nodes included in the portion of the graph, wherein the machine learning model is trained to automatically label nodes according to a set of predetermined labels indicating attributes of entities represented by a corresponding node, and wherein the community graphs are generated based on labels automatically assigned to nodes included in the portion of the graph.

17. The system of claim 15, wherein performing the one or more preventative actions is further based on identifying one or more patterns within respective closure graphs, and wherein performing the one or more preventative actions includes preventing an entity represented by a target node included in one of the closure graphs from performing further electronic communications.

18. The system of claim 15, wherein performing the one or more preventative actions is further based on:

generating a summary graph for respective closure graphs; and inputting the summary graph into a machine learning trained to automatically determine whether nodes connected to the target nodes in the summary graph have similar attributes to the target nodes.

19. The system of claim 15, wherein generating closure graphs for respective clusters includes:

determining a size of graphs included in the respective clusters; and executing, based on respective determined sizes, ones of a plurality of types of graph mapping algorithms that correspond to the respective determined sizes.

20. The system of claim 15, wherein the closure graph for the given cluster further includes:

representing edges between the duplicate node and one or more other nodes using a number of communications occurring between the duplicate node and the one or more other nodes according to a number of communications occurring between the duplicate node and the one or more other nodes in the two or more community graphs.

* * * * *